Sept. 4, 1956 L. B. PAYNE 2,761,235
ARTIFICIAL BAIT RETRIEVER
Filed Dec. 22, 1953
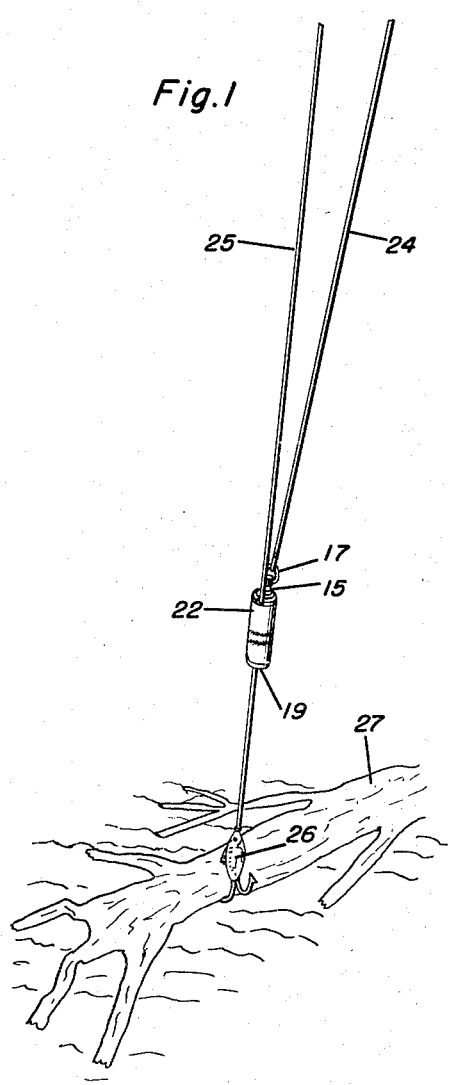
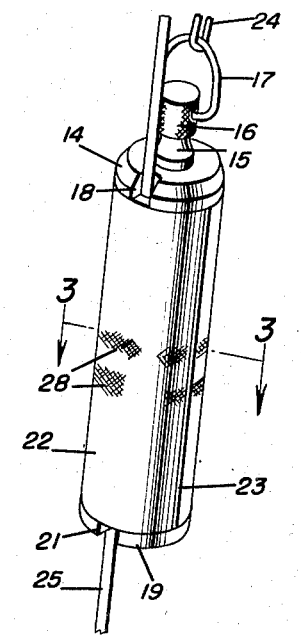
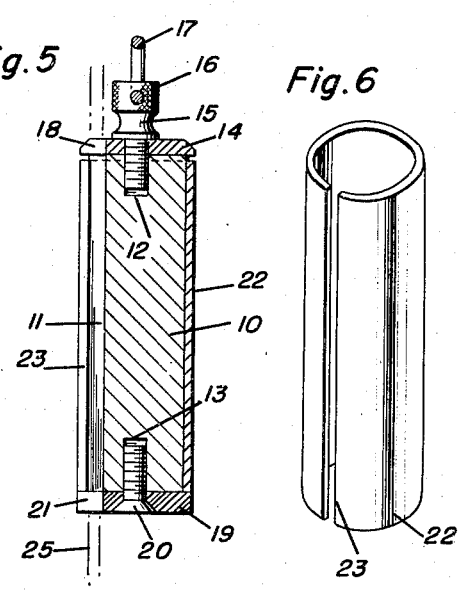
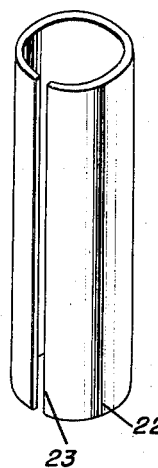
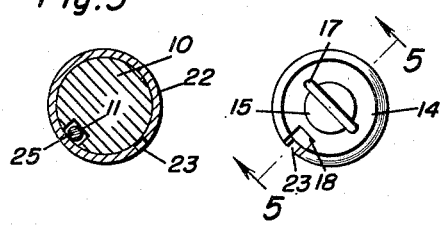
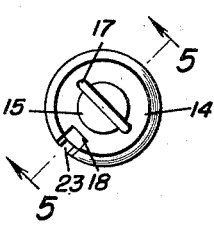
Lester B. Payne
INVENTOR.

United States Patent Office 2,761,235
Patented Sept. 4, 1956

2,761,235

ARTIFICIAL BAIT RETRIEVER

Lester B. Payne, Gladwater, Tex.

Application December 22, 1953, Serial No. 399,805

1 Claim. (Cl. 43—17.2)

The present invention relates to new and useful improvements in artificial fish bait or lure retrievers and has for its primary object to provide, in a manner as hereinafter set forth, a device of this character comprising a novel construction and arrangement of parts whereby fishing lines which have become fouled or snagged on submerged objects may be expeditiously freed.

Another very important object of the invention is to provide an artificial bait or lure retriever of the aforementioned character which embodies novel means for slidably mounting the device on the line to be freed.

Other objects of the invention are to provide a retriever of the character described which will be comparatively simple in construction, durable, compact and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a perspective view, showing a retriever constructed in accordance with the present invention in position on a fishing line;

Figure 2 is a perspective view, illustrating the method of mounting the device on the line;

Figure 3 is a view in horizontal section, taken substantially on the line 3—3 of Figure 2;

Figure 4 is a top plan view of the retriever;

Figure 5 is a vertical sectional view, taken substantially on the line 5—5 of Figure 4; and Figure 6 is a detail view in perspective of the rotary sleeve.

Referring now to the drawing in detail, it will be seen that the embodiment of the invention which has been illustrated comprises an elongated, cylindrical metallic weight or body 10 of suitable length and diameter. Formed longitudinally in the weight 10 and extending from end to end thereof is a groove or channel 11. Formed centrally in the upper and lower end portions of the weight 10 are threaded, longitudinal bores or sockets 12 and 13.

Mounted on the upper end of the weight 10 and projecting beyond the periphery thereof is a tapered, apertured disk 14 of suitable metal. A thumb screw 15 secures the disk 14 in position, said thumb screw including a knurled head 16 having journalled thereon a split ring or bail 17. The bore 12 accommodates the screw 15. The disk 14 has formed therein a peripheral notch 18 which is aligned with the groove or channel 11.

Mounted on the lower end of the weight 10 and projecting beyond the periphery thereof is a metallic disk 19. A countersunk screw 20 secures the disk 19 on the cylindrical weight 10, said screw being threaded into the socket or bore 13. The disk 19 has formed therein a peripheral notch 21 which is aligned with the groove or channel 11.

Mounted for rotation on the cylindrical weight 10 and retained thereon by the disks 14 and 19 is a sleeve 22 of suitable metal. Formed longitudinally in the sleeve 22 and extending from end to end thereof is a slot 23 for registry with the groove or channel 11. It will thus be seen that the sleeve 22 is longitudinally split.

It is thought that the manner in which the device is used will be readily apparent from a consideration of the foregoing. Briefly, a retrieving line 24 is connected to the bail 17. In Figure 1 of the drawing, reference character 25 designates a fishing line of the type having an artificial bait or lure 26 connected to one end thereof, which bait or lure has become snagged on a submerged object 27. To disengage the lure 26 from the object 27, the sleeve 22 is rotatably adjusted on the cylindrical weight 10 to bring the slot 23 into registry with the groove 11. The line 25 is then inserted in the groove 11 through the slot 23, said line passing through the aligned notches 18 and 21 in the disks 14 and 19, respectively. The sleeve 22 is then rotated in either direction on the cylindrical weight 10 to move the slot 23 out of alignment with the groove 11 thereby closing said groove for slidably securing the weight on said line. Through the medium of the line 24, the weight 10 is then slid down the fishing line 25 for knocking the lure 26 loose. The sleeve 22 is knurled as at 28 to facilitate rotation thereof.

Although a preferred embodiment of the device is as illustrated and described, it is to be understood that changes in the details of construction may be resorted to which will fall within the scope of the invention as claimed.

What is claimed as new is as follows:

An artificial lure retriever comprising: an elongated, cylindrical weight having a longitudinal groove therein extending from end to end thereof for slidably receiving a fish line, said weight further having longitudinal threaded bores in its end portions, metallic disks mounted on the ends of the weight and projecting beyond the periphery thereof, each disk having a peripheral notch therein aligned with the groove for the passage of the fishing line, screws threadedly engaged in the bores for securing the disks in position on the weight, one of said screws including a knurled head, a bail pivotally mounted on said head, a retrieving line connected to the bail, and a metallic sleeve rotatably mounted on the weight and retained thereon by the disks, said sleeve being adjustably positionable on said weight for closing the groove for retaining the fishing line therein, said sleeve having a longitudinal slot therein extending from end to end thereof and adapted upon rotation of said sleeve to register with the groove for inserting the fishing line therein, said sleeve gripping the weight for frictional retention in adjusted position thereon.

References Cited in the file of this patent

UNITED STATES PATENTS

| | | |
|---|---|---|
| 1,600,652 | Steenstrup | Sept. 21, 1926 |
| 2,001,241 | De Vries | May 14, 1935 |
| 2,385,415 | Jackson | Sept. 25, 1945 |
| 2,594,852 | Bivins | Apr. 29, 1952 |
| 2,651,132 | Lennen | Sept. 8, 1953 |
| 2,662,328 | Oyler | Dec. 15, 1953 |